J. BOE.
MACHINE FOR BORING BLIND-STILES.

No. 171,546. Patented Dec. 28, 1875.

Witnesses
Chas. Nahlers.
Otto Hufeland

Inventor.
John Boe
by Van Santvoord & Hauff
his attys.

UNITED STATES PATENT OFFICE.

JOHN BOE, OF MOUNT VERNON, NEW YORK.

IMPROVEMENT IN MACHINES FOR BORING BLIND-STILES.

Specification forming part of Letters Patent No. 171,546, dated December 28, 1875; application filed October 13, 1875.

*To all whom it may concern:*

Be it known that I, JOHN BOE, of Mount Vernon, in the county of Westchester and State of New York, have invented a new and useful Improvement in Machinery for Boring Blind-Stiles, which improvement is fully set forth in the following specification, reference being had to the accompanying drawing, in which—

Figure 1:
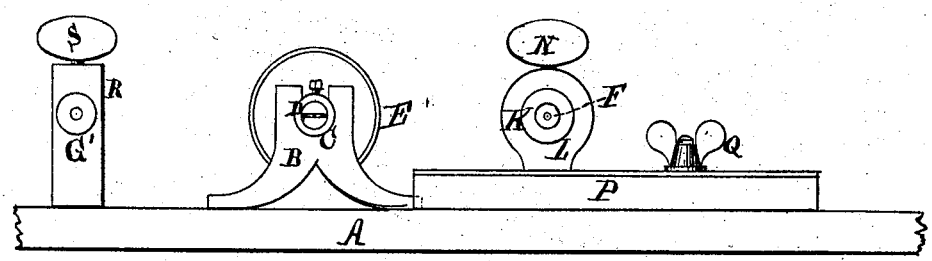
Figure 2:
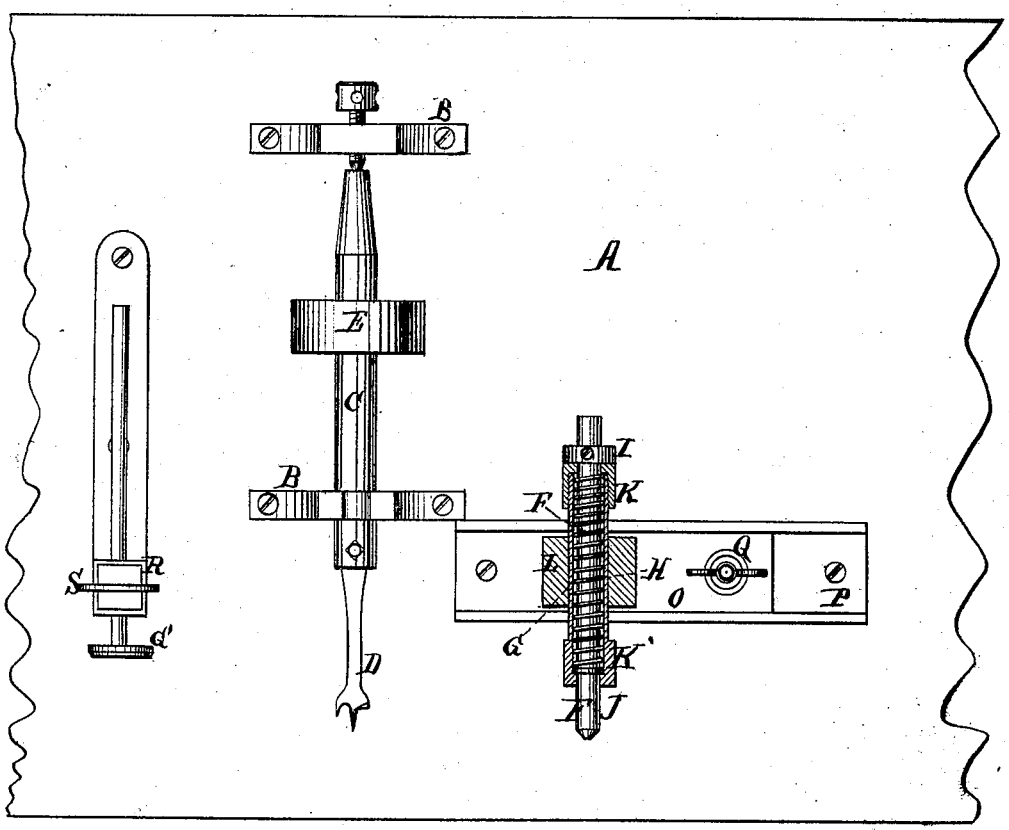

Figure 1 represents a front elevation of my improvement. Fig. 2 is a plan view thereof, partly in section.

Similar letters indicate corresponding parts.

This invention relates to certain improvements in boring machinery, and which are particularly applicable for boring blind-stiles. It consists in an improved gage for determining the distances of the holes from each other, such gage consisting of a pin which is subjected to the action of a spring, and is placed parallel to the bit, its free end projecting beyond the end of the bit, the gage being made and arranged in such a manner that when a blind-stile, or other article, is pressed against the forward end of the gage, the latter yields to such pressure, so that the stile is allowed to come against the bit, and a hole is bored by it in the stile. The end of the gage is made tapering, so that it can enter the holes made by the bit. When the workman has made one hole near the end of the stile, the stile is placed on the bench in such a position that the end of the gage will enter the hole, and the stile being then pushed against the gage, the gage yields and permits the stile to come against the bit, which bores another hole, the stops, one of which is formed by the end of the tube in which the gage slides, limiting the inward movement of the stile, and consequently determining the depth of the hole. Each hole in succession is brought up to the end of the gage, and it follows, therefore, that the successive holes will be bored at a uniform distance apart, which distance is determined by the position of the gage without requiring a workman to lay off such distances, as has been heretofore done. When the stile is withdrawn, the gage is caused to return to its original position by the action of the spring.

With the spring-gage is combined one or more stops for the purpose of arresting the stile when it is pressed against the gage, and thus determining the depth of the holes formed by the bit. The gage is made adjustable in a direction transverse to the bit of the machine, in order that the distances of the holes made by the bit apart from each other may be regulated, and it is also adjustable in the direction of its axis, so as to suit its position to different bits.

In the drawing, the letter A designates a bench, on which are secured brackets B B, which form the bearings for the mandrel C of a boring-bit, D. On the mandrel C is mounted a pulley, E, by which the bit is turned. The letter F designates a pin, which constitutes the gage of my machine. This pin or gage is arranged in a tube or barrel, G, which contains also a spiral spring, H, to the action of which the gage is subjected, and which has a tendency to force the gage outward, or in the direction of the point of the bit D, as shown in the drawing. The rear part of the gage is provided with an adjustable collar, I, which abuts against the back end of the barrel G, and thereby serves to regulate the position of the gage in the barrel. The collar, I, is so adjusted that the front end of the gage projects from the tube or barrel G, a little beyond the end of the bit D. The ends of the tube or barrel G are closed by means of flanged nuts K K', the front one of which forms a stop for the stile. The barrel G is arranged to slide in an adjustable head, L, and it is rendered adjustable therein by means of a screw, N, Fig. 1, the object of which adjustability will be hereinafter specified. The head L rises from a plate, O, which is fitted in a grooved slide, P, placed transversely to the bit A, the plate being fastened in any desired part of the slide by means of a set-screw, Q, so that it is adjustable toward and from the bit.

In operating my machine, the blind-stile, or other article to be bored, is pressed against the yielding gage F, until the stile has been bored by the bit, and is arrested by the stops K K'. The stile is then withdrawn and moved so that the hole just formed is brought opposite the gage F, whose diameter is such that it does not enter the hole except on the extremity which is made to taper slightly for this purpose. The gage is then again pressed in, as before, whereby the bit is allowed to form a second hole in the stile, and this operation is repeated until the desired number of holes are bored. By means of the gage F, the holes are made at a uniform distance apart from each other, which distance is equal to that between the gage and the bit D and the gage being made adjustable toward and from the bit, as before stated, I am enabled to vary the space between the holes at will.

The depth of the holes formed by the bit D is regulated by the position of the barrel G, whose end K constitutes a stop to arrest the movement of the stile on one side of the bit, as before explained. On the other side of the stile I have arranged a supplemental stop, K', which is fastened parallel with the bit D, in a bracket, R, by means of an adjusting-screw, S. This supplemental stop K' should be made to coincide with the stop K, and both the stops being made adjustable, any desired depth may be given to the holes in the stile.

I am aware that an adjustable pointer has been affixed to the bed which carries the boring-tools in a boring-machine, the effect of such pointer being to indicate the point at which the next hole is to be bored, and therefore I disclaim the broad idea of a pointer or indicator combined with the boring-tools, as above set forth.

What I claim as new, and desire to secure by Letters Patent, is—

1. The combination of the spring-gage F, arranged as described, in the tube G, with a boring-bit, substantially as set forth.

2. The combination of the spring-gage F, the adjustable tube G, having a stop, K, at its forward end, the stop K', and a boring-tool, substantially as described.

In testimony that I claim the foregoing I have hereunto set my hand and seal this 11th day of October, 1875.

JOHN BOE. [L. S.]

Witnesses:
J. VAN SANTVOORD,
D. V. SANTVOORD.